Feb. 15, 1966
R. A. PASINSKI ET AL
3,235,011
SOD ROLL FORMING MACHINE
Filed Dec. 12, 1962
3 Sheets-Sheet 1
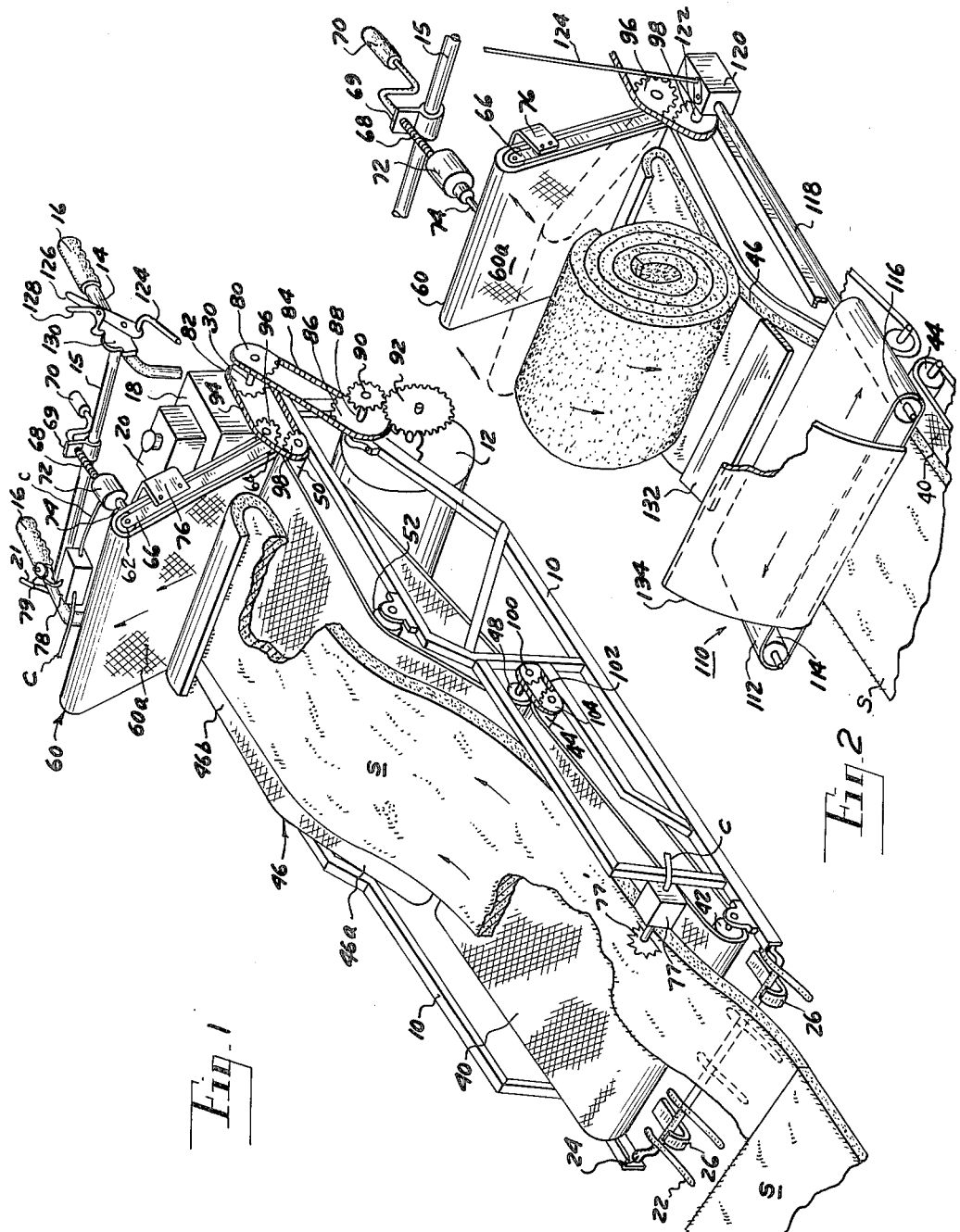
INVENTORS.
RICHARD A. PASINSKI
BY RALPH R. PASINSKI
ATTORNEY

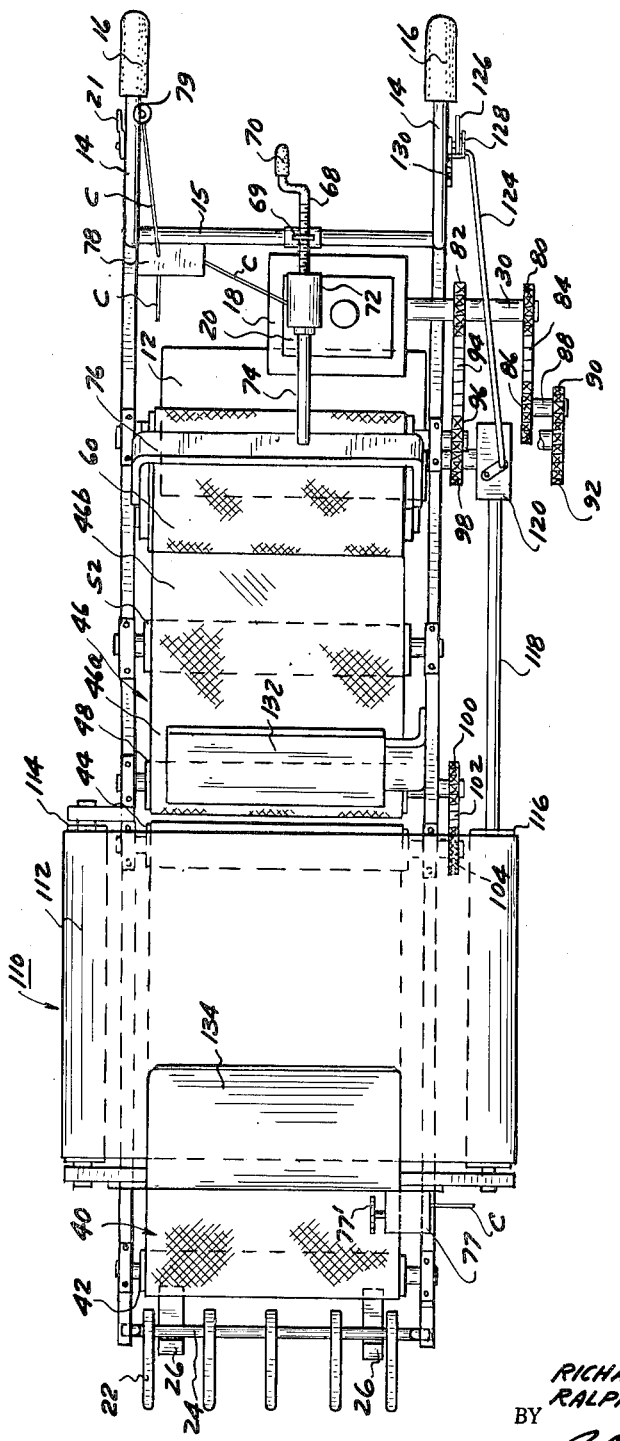

Feb. 15, 1966  R. A. PASINSKI ET AL  3,235,011
SOD ROLL FORMING MACHINE
Filed Dec. 12, 1962

INVENTORS.
RICHARD A. PASINSKI
RALPH R. PASINSKI
BY
ATTORNEY

United States Patent Office 3,235,011
Patented Feb. 15, 1966

3,235,011
SOD ROLL FORMING MACHINE
Richard A. Pasinski, 16217 Stout, and Ralph R. Pasinski, 1719 Sunderland, both of Detroit 19, Mich.
Filed Dec. 12, 1962, Ser. No. 244,113
11 Claims. (Cl. 172—19)

The present invention relates to a sod roll forming machine, and particularly to a machine adapted to strip or scoop-up a pre-cut length of sod from the ground and to form it into a roll or bundle convenient for subsequent handling.

A number of sod roll forming machines have already been devised, but insofar as we are aware thay have not attained general wide-spread use. There are probably a number of reasons for this. For one, those that are massive and weighty have a tendency to become mired in the soft sod fields. Also, the massive ones are costly to manufacture and therefore their use would be restricted to the very large sod farms, if feasible even there. Others, particularly the smaller less costly machines, are commonly characterized by frequent stopping and slow speed, and thereby low output. Still others are not as maneuverable as required.

It has been our observation that today many sod farms use machines for pre-cutting the sod into strips and for undercutting the strips (i.e. separating them from the ground) but use manual labor for rolling the strips into a bundle or roll for subsequent handling. This seems to us to be an arduous, costly and slow method for forming sod rolls, and indicates that the need is there and yet unsatisfied because the requirements of a sod roll forming machine for wide spread acceptance have not yet been met.

A broad object of our invention is to provide a sod roll forming machine having improved characteristics in one or more of the respects set forth above, and which therefore has potential of gaining wide spread use.

A further object of the invention is to provide a sod roll forming machine which is relatively compact and lightweight and therefore less tendencied to become mired in soft sod fields.

A further object of the invention is to provide an improved sod roll forming machine which is relatively inexpensive to construct yet fast and efficient in operation.

A further object is to provide such a machine which is easily maneuverable, which can travel over the ground at a relatively high rate of speed as it forms the sod rolls, and which need not stop or slow down as it ejects each formed roll.

A further object is to provide such a machine which lifts the sod off the ground to form the roll, and which forms the roll in an efficient and positive manner.

A further object is to provide such a machine which, by its inherent design, is easily pre-settable to handle sod strips of different thicknesses or of different lengths.

A still further object is to provide such a machine with an ejector which will permit the formed sod roll to be ejected to the ground in either lateral direction with respect to the machine travel direction.

The foregoing objects, as well as additional objects and advantages which will become readily apparent as the description proceeds, are attainable by our invention described below with reference to the drawings illustrating a preferred embodiment thereof, wherein:

FIGURE 1 is a perspective view of a sod roll forming machine constructed in accordance with the invention, this view omitting the ejector mechanism for purposes of clarity;

FIGURE 2 is a perspective view of a preferred form of ejector mechanism for use with the machine of FIGURE 1;

FIGURE 3 is a top plan view of the machine of FIGURES 1 and 2; and

Figure 4:
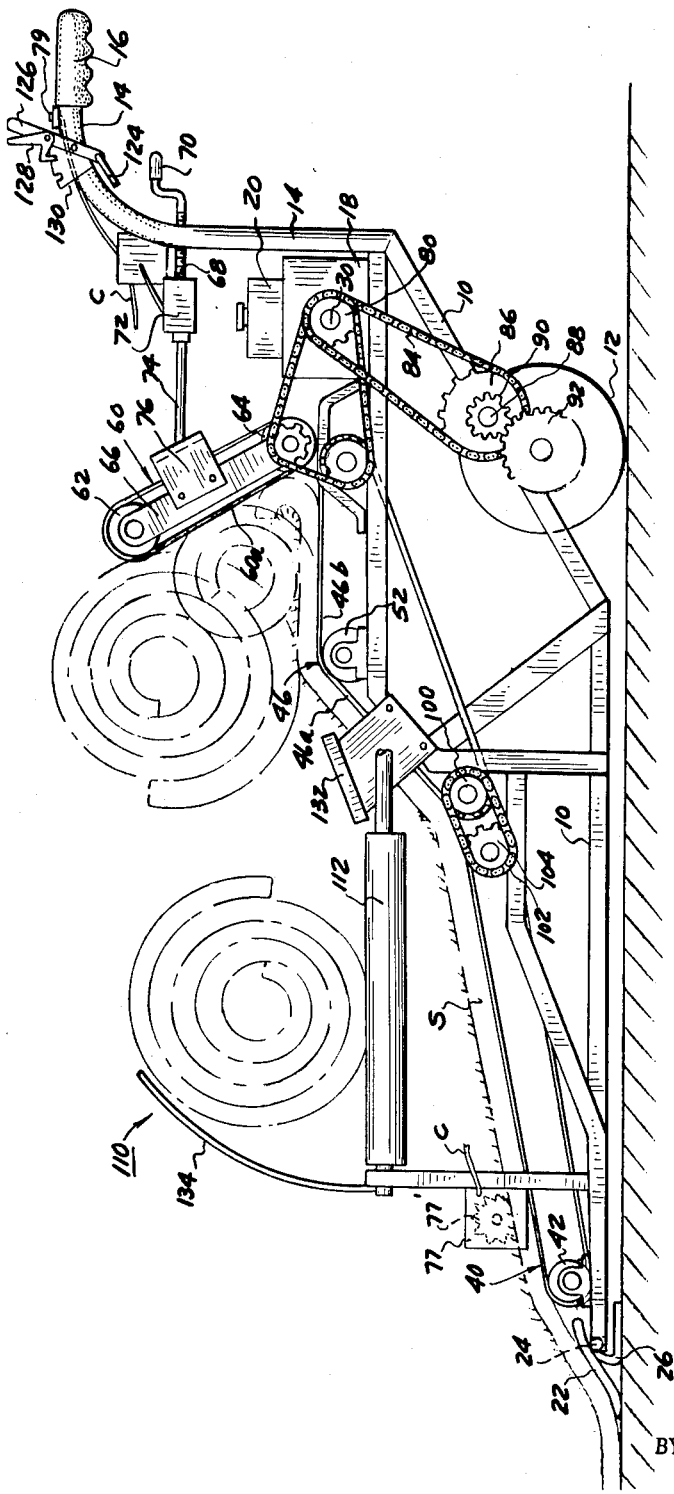
FIGURE 4 is a side elevational view of the same machine.

With reference to the drawings, FIGURE 1 illustrates a strip of pre-cut sod S being scooped up off the ground, and FIGURE 2 illustrates the strip in its rolled form just before it is ejected from the machine onto the ground. The various stages the strip passes through as it is wound into the final roll are shown in broken lines in FIGURE 4.

The illustrated machine comprises a frame structure 10 mounted on a drum 12 to enable the machine to be propelled over the ground. At the rear of the machine, where the operator would be, a pair of handle bars 14 are attached to the frame structure and are braced by a cross-bar 15. The handle bars terminate in hand grips 16 adapted to be engaged by the operator for steering the machine. The power drive, which in this case is gasoline engine 18, is also located at the rear of the machine and is supported by the frame structure 10. The gasoline engine is supplied by gasoline stored in tank 20 and is controlled by throttle 21 supported on one handle bar 14. The forward end of the machine carries a scoop 22 having a plurality of teeth mounted on a cross-bar 24 attached to the frame structure and also carrying a pair of skids 26 allowing the forward end of the machine to move over the ground as the scoop 22 picks up the sod strip S.

Drum 12 and the other power driven mechanisms are powered from engine 18, drive shaft 30 connected to the engine, and the transmission system to be described.

The mechanisms which are power-driven include conveyor belt 40 extending at a slight upward angle or incline from the forward end of the machine to a point which is about half-way to the rear end of the machine. Belt 40 is supported at one end by roll 42 and at its other end by roll 44, both rolls being journalled to the machine frame structure. A second power-driven conveyor belt 46 is supported by three rolls, these being end rolls 48, 50 and middle roll 52, all three rolls of which are also journalled to the machine frame structure. The forward end of belt 46, supported between end roll 48 and middle roll 52, is designated as 46a, and as shown in the drawings it is disposed adjacent to but slightly spaced from the point where belt 40 terminates. Portion 46a of belt 46 extends toward the rear at a substantially steeper incline than belt 40. The rearward portion of belt 46, designated 46b, is supported so as to be substantially horizontal to the machine and the ground over which the machine travels.

In operation, belt 40 and portion 46a of belt 46 are adapted to convey the strip of sod at an upward incline, that is raise it, to portion 46b, where the strip is formed into a roll.

The means for rolling the sod strip S is supported just above the rear end of belt portion 46b. It includes means providing a moving surface adapted to engage, in a tangential manner, first the leading edge of the sod strip and then the complete strip. The moving surface is driven in a direction such that it tends to wind the strip into a roll.

This roll forming means comprises a third belt 60 supported by a pair of rolls 62 and 64 carried at opposite ends of a bracket 66. The lower end of bracket 66 is pivotally supported to the machine frame such that the bracket and belt 60 are permitted to move from an angle of about 30° to about 120° with respect to the horizontal portion, 46b, of conveyor belt 46. Belt 60 thus provides a flat moving surface, identified as 60a, engageable with the sod strip S, surface 60a being engageable by the sod strip at an angle of about 30°–120° and being driven as illustrated in FIGURE 1 in a direction tending to wind the strip into a roll. The pivotal mounting of bracket 66 and its belt 60 permits adjustment of the angle of incidence of the sod strip with respect to moving surface 60a.

The means for adjusting the belt 60, and thereby the angle of incidence of the sod strip with respect to flat moving surface 60a, comprises a screw and nut arrangement, including a rod 68 having a threaded portion passing through a nut 69 mounted on cross-bar 15. One end of rod 68 carried a handle 70 enabling the operator to rotate it in order to adjust bracket 66. The opposite end of rod 68 would normally engage the bracket 66. However, the disclosed machine embodiment includes an optional feature of an automatic roll ejector which senses the length of the sod strip and ejects the roll after a predetermined length has been handled. For this purpose, rod 68, in this embodiment, carries an electrical solenoid 72 having a plunger engageable with another rod 74, which in turn is engageable with another bracket 76. Solenoid 72 is actuated with a presettable length measuring device 77 to pivot bracket 66 for ejecting the wound roll, when this feature is included. Normally, however, ejection of the roll does not require solenoid 72, as will be later explained. When solenoid 72 is provided, it is connected by cable C to device 77 and to a source of supply, such as batteries 78, through push-button switch 79. Presettable device 77 provides automatic ejection of the sod roll when the pre-set length has been measured, and switch 79 provides manual control of the ejection when, for example, a shorter length of sod roll is to be ejected. Presettable device 77 may be any suitable known length measuring device, including a toothed wheel $77^1$ such as are used, for example, in measuring yard goods.

Belts 40, 46 and 60, as well as propelling drum 12, are all power driven from drive shaft 30, the transmission therefore being as follows: Drive shaft 34 carries a pair of sprocket wheels 80, 82. Outer sprocket wheel 80 is coupled by a chain 84 to another sprocket wheel 86 secured to a shaft 88 which has secured thereto a gear 90. Gear 90 meshes with gear 92 carried by the shaft supporting propelling drum 12 from the frame structure, to thereby drive drum 12 to propel the machine over the ground. Inner sprocket wheel 82 is coupled by chain 94 to sprocket wheel 96 carried by roll 64, to drive belt 60. The same chain 94 engages sprocket wheel 98 carried by roll 50, to drive belt 46. Conveyor belt 40 is driven through sprocket wheel 100 carried by roll 48 (of belt 46), which drives chain 102 and sprocket wheel 104 carried by roll 44.

Insofar as described, it is seen that as the machine is propelled over the ground by drum 12, the pre-cut strip of sod is scooped up by scoop 38, conveyed by belt 40 and then by belt 46 until it engages at an acute angle flat moving surface 60a of belt 60, whereupon it is wound into a roll. All the mechanisms so far described are driven by engine 30.

As the sod is rolled, the diameter of the roll increased (as shown in broken lines in FIGURE 4) until its center of gravity, that is its longitudinal axis, passes the line of juncture with respect to portions 46a and 46b of belt 46. When this occurs, the sod rolls roll off the belt portion 46b to the ejector to be presently described. The size the sod roll will attain before it passes this point is determined by the angle setting of belt 60, since a smaller angle with this horizontal will cause the belt to engage the sod at a point closer to this juncture line and will thereby result in a smaller roll being formed before it is ejected. Optionally, solenoid 72 can also be used for ejecting the roll, as will be described.

The belt angle should be set for the conditions of the particular strips of sod being handled, to the end that the roll will be of the right size according to the pre-cut dimensions of the sod strip before the roll axis passes the juncture line between belt portions 46a and 46b. Different sod conditions can change the roll size for a predetermined sod strip. For example, moist conditions will tend to make a greater thickness in the sod strip, and thereby a greater diameter for a predetermined length. Setting the belt angle is accomplished by rotating handle 70. Once the belt angle has been set for a particular condition of the sod, it normally need not be reset.

The ejector for receiving and ejecting the roll of sod onto the ground is generally designated 110 and is shown particularly in FIGURE 2. It includes a further conveyor belt 112 mounted transversely of the machine frame at a point to receive the sod roll as it rolls off belt portion 46b. Belt 112 is supported by a pair of rollers 114, 116, and is driven by a shaft 118 coupled between roller 116 and a forward-reverse transmission mechanism 120. The latter is coupled to the drive by shaft 122 carried by gear 98. Transmission 120 controls the direction of rotation of roller 116 to drive belt 112 in one or the opposite direction (as shown by the arrows in FIGURE 2) by a shaft rod 124 connected at one end to a shift lever 126 (FIGURE 1) supported on one of the handle bars 14 in a position to be conveniently manipulatable by the operator. Shift lever has two positions, one being forward and the other being reverse, and is retained in either shifted position, by a latch 128 receivable in a notched plate 130 carried by the handle bar 14. The operator may thus conveniently control the direction of belt 112 by manipulation of shift lever 126 so that belt 112 moves in one or the other direction transverse to the longitudinal axis of the machine. This control of belt 112 will determine to which lateral side of the machine the sod roll will be ejected.

It is thus seen that when the sod roll forms on belt 46, particularly the horizontal portion 46b, its diameter will grow until it rolls off onto ejector belt 112, whereupon it will be driven to one side or the other, depending upon the setting of shift lever 126. A bridge plate 132 is supported by the machine frame between belt portion 46b and ejector belt 112 to conduct the formed sod roll from the former to the latter. In addition, a curved shield 134 also supported by the machine frame limits the movement of the sod roll as it moves onto the ejector belt 112 and assures that it will be ejected laterally of the machine by belt 112.

The ejecting mechanism so far described does not require the use of solenoid 72 since the formed sod roll will automatically roll off belt portion 46b when it has attained a predetermined diameter, this diameter being controlled by the pre-set position of belt 60. Usually, this will be adequate since the predetermined lengths of sod will attain approximately the same roll diameters, assuming the sod field conditions are the same. However, in some cases it may be desirable to control more positively the ejection of the sod roll. This is accomplished by solenoid 72 and its presettable length measuring device 78 which senses more directly the sod strip length, solenoid 72 being actuated when the present length has been measured to pivot belt 60 foward and thereby to move the sod roll onto the ejection belt 112. It will, of course, be understood that the use of solenoid 72 is optional and need not be included.

Both conveyor belts 40, 46, and sod roll forming belt 60 are preferably of an open mesh construction so that the dirt and stones that may separate from the sod strip will be permitted to fall through to the ground and will not accumulate and tend to clog the machine. Also, if desired, drive roller 12 may be formed with cleats to provide greater ground traction.

It has been found particularly advantageous to design the various gears such that belt 40 is driven somewhat faster than drum 12 and belt 46 is driven somewhat faster than belt 40. This tends to provide a continuous pull on the sod strip S, keeping it straight and preventing its buckling. Also, it has been found advantageous to drive belt 60 somewhat faster than belt 46 which tends to wind the sod strip into a tight roll.

In operation, the operator steers the machine as it is propelled over the ground. A strip of sod is scooped up by scoop 22 and conveyed by conveyor 40 at an upward incline rearwardly of the machine. When it reaches conveyor 46, it is further raised by conveyor portion 46a whereupon it reaches horizontal conveyor portion 46b and passes further rearwardly until it engaged the flat moving surface 60a of belt 60. Depending upon the setting of belt 60, the sod roll engaged flat moving surface 60a at an angle of 30°–120°, the belt moving in a direction tending to wind the strip into a roll. As the diameter of the roll increases, its center of gravity shifts toward the junction of conveyor belt portions 46a and 46b, until it passes that juncture, whereupon it will roll down, under gravity, across bridge plate 132 onto ejector belt 112. The latter belt, being continuously driven, thereupon ejects the roll laterally to one or the other side of the machine, depending upon the direction belt 112 is driven as controlled by the setting of shift lever 126.

The sod strips are thus rolled and ejected in an automatic and continuous manner as the machine is propelled over the ground, scooping up the sod strips in succession.

In the above described operation, the ejection of the sod roll is automatically effected by the fact that its diameter increases as the roll is formed, until its center of gravity passes the juncture between belt portions 46a and 46b. For more positive control, presettable device 77 and solenoid 72 can be used to effect this ejection, presettable device 77 measuring the sod strip length and actuating solenoid 72 when it is of the desired length, whereupon solenoid rocks belt 60 to cause the sod roll center of gravity to pass the belt juncture and thereby to roll onto the ejector belt 112. Also, ejection can be effected by manually actuating push-button switch 79 to actuate the solenoid.

While there has been illustrated and described a preferred embodiment of the invention, it will be understood that various features thereof, singly and in combination, may be applied in other forms and embodiments, and therefore the invention is to be limited only as defined in the following claims.

We claim:

1. A sod roll forming machine, comprising a frame structure; scoop means mounted at the front of said frame structure adapted to scoop up a strip of sod; means mounting said frame structure for movement over the ground; said mounting means being disposed rearwardly of said scoop means and carrying substantially the entire weight of the machine; conveyor means mounted toward the front of said frame structure for receiving a strip of sod and for carrying said strip of sod toward the rear of the machine with the earth side of the strip engaging the conveyor means; said conveyor means including a first portion extending at an upward incline from a point adjacent to the ground at the front of the machine toward the rear of the machine; and a second portion extending rearwardly from said first portion and forming a juncture with said first portion; sod roll forming means disposed rearwardly of said juncture and forming a generally flat moving surface extending upwardly from said second portion, the lower portion of the moving surface being adjacent the rearward end of said second portion in position to intercept the strip of sod and wind it into a roll of increasing diameter until the center of gravity of the roll passes over said juncture, whereupon the sod roll automatically rolls off said second portion under the force of gravity when the roll attains a predetermined diameter; and ejector means positioned in front of and below said juncture for receiving said roll when it rolls off said second portion and ejecting the roll laterally of the machine.

2. A sod roll forming machine as defined in claim 1, wherein said sod roll forming means is movable with respect to said juncture thereby permitting a variation in the diameter the roll will attain before its center of gravity will pass said juncture.

3. A sod roll forming means as defined in claim 2, wherein said ejector means comprises a power driven ejector belt supported transversely of the machine frame structure over said first portion and in front of and below said second portion.

4. A sod roll forming machine as defined in claim 3, further including means for controlling the direction of the ejector belt drive so as to selectively eject the sod roll to one of the opposite lateral sides of the machine.

5. A sod roll forming machine as defined in claim 1, further including drive means connected to said mounting means for driving the machine over the ground, and means connecting said first conveyor means to said drive means for driving the first conveyor means.

6. A sod roll forming machine as defined in claim 1, wherein said sod roll forming means comprises a rotatably driven endless belt forming a flat moving surface, said belt being supported with respect to said second conveyor portion so that the leading edge of the sod strip engages the belt at an angle of from 30° to 120° with respect to said flat moving surface.

7. A sod roll forming machine as defined in claim 6, further including means for pivotally supporting said endless belt so that the angle the sod strip engages same may be varied to vary the diameter the sod roll will attain before its center of gravity will pass said juncture, and further including means for holding said endless belt against pivotal movement while the sod roll is being formed.

8. A sod roll forming machine, comprising a frame structure; scoop means mounted on said frame structure adapted to scoop up a strip of sod; means mounting said frame structure for movement over the ground; conveyor means for receiving the strip of sod and for carrying said strip of sod toward the rear of the machine with the earth side of the strip of sod engaging the conveyor means; said conveyor means including a first portion extending at an upward incline from a point adjacent said scoop means and the ground toward the rear of the machine; and a second portion extending rearwardly from said first portion and forming a juncture with said first portion; sod roll forming means disposed rearwardly of said juncture and forming a generally flat moving surface extending upwardly from said second portion, the lower portion of said moving surface being adjacent the rearward end of said second conveyor portion in position to intercept the strip of sod and wind it into a roll of increasing diameter until the center of gravity of the roll passes over said juncture, whereupon the sod roll automatically rolls off said second portion under the force of gravity when it attains a predetermined diameter; and ejector means positioned in front of and below said juncture for receiving said roll when it rolls off said second portion and ejecting the roll laterally of the machine.

9. A sod roll forming machine, comprising: a frame structure; scoop means mounted at the front of said frame structure adapted to scoop up a strip of sod; means mounting said frame structure for movement over the ground and disposed rearwardly of said scoop means; conveyor means mounted toward the front of said frame structure for receiving a strip of sod and for carrying said strip of sod toward the rear of the machine; said conveyor means including a first portion extending at an upward incline from the forward end toward the rear of the machine, and a second portion extending rearwardly from said inclined portion and forming a juncture with said first portion; sod roll forming means engageable with said sod strip for winding said sod strip into a roll of increasing diameter; said sod roll forming means being disposed rearwardly of and adjacent the rearward end of said second conveyor portion and arranged such that as the diameter of the sod roll increases, the center of gravity of the sod roll shifts toward the juncture between the first and second conveyor portion; an electrical solenoid operably connected to said roll forming means and operable to physically move the sod roll so that its center of gravity passes said juncture, thereby causing the ejection of the sod roll; and means engaging said sod strip and including a length measuring device adapted to measure the sod strip and operably connected to said solenoid to actuate said solenoid when a predetermined length of the sod strip has been measured.

10. A sod roll forming machine as defined in claim 9, further including an electrical switch manipulatable by the machine operator for actuating said solenoid.

11. A sod roll forming machine, comprising: a frame structure; scoop means mounted at the front of said frame structure and adapted to scoop up a strip of sod; drive means for moving the machine over the ground disposed rearwardly of said scoop means; conveyor means mounted toward the front of said frame structure for receiving a strip of sod from said scoop means and for carrying said strip of sod toward the rear of the machine; means connecting said conveyor means to said drive means for driving same; said conveyor means including a first portion extending at an upward incline from the forward end toward the rear of the machine, and a second portion extending rearwardly from said inclined portion and forming a juncture with said first portion; and a rotatably driven member engageable with said sod strip for winding said sod strip into a roll of increasing diameter; said rotatably driven member being disposed rearwardly of and adjacent the rearward end of said second conveyor portion and arranged such that as the diameter of the sod roll increases, the center of gravity of the sod roll shifts toward the juncture between the first and second conveyor portions; means positioned forward of said juncture and adapted to receive said sod roll when its center of gravity passes said juncture and to eject it from the machine; said rotatably driven member comprising a rotatably driven endless belt forming a flat moving surface, said belt being supported with respect to said second conveyor portion so that the leading edge of the sod strip engages the belt at an angle of from 30° to 120° with respect to said flat moving surface; means for pivotally supporting said endless belt so that the angle the sod strip engages same may be varied to vary the diameter the sod roll will attain before its center of gravity will pass said juncture; an electrical solenoid operably connected to said roll forming means and operable to move the sod roll so that its center of gravity passes said juncture, thereby causing the ejection of the sod roll; and means engaging said sod strip and including a length measuring device adapted to measure the sod strip and operably connected to said solenoid to actuate said solenoid when a predetermined length has been measured.

References Cited by the Examiner

UNITED STATES PATENTS

| | | | |
|---|---|---|---|
| 456,484 | 7/1891 | Fisher | 100—88 |
| 565,069 | 8/1896 | Ellis | 100—88 |
| 972,884 | 10/1910 | Luebben | 100—87 |
| 1,292,232 | 1/1919 | Barton | 172—195 X |
| 2,617,347 | 11/1952 | Provost | 172—20 |
| 2,663,242 | 12/1953 | Lancaster | 172—19 |
| 2,756,661 | 7/1956 | Frisbie et al. | 172—20 |
| 3,051,251 | 8/1962 | Golden | 172—20 |
| 3,053,328 | 9/1962 | Geipel | 172—19 |

ABRAHAM G. STONE, *Primary Examiner.*